United States Patent [19]

Christensen et al.

[11] Patent Number: 4,765,942
[45] Date of Patent: Aug. 23, 1988

[54] METHOD OF CONSOLIDATING THERMOPLASTIC POLY(AMIDE-IMIDE) COMPONENTS

[75] Inventors: Stephen Christensen, King County, Wash.; Jay O. Rakel, Dupage County, Ill.; Donald J. Ayers, Snohomish County, Wash.

[73] Assignee: The Boeing Company, Seattle, Wash.

[21] Appl. No.: 913,525

[22] Filed: Sep. 30, 1986

[51] Int. Cl.[4] .............................................. B29D 9/00
[52] U.S. Cl. .................................... 264/510; 264/258; 264/313; 264/331.12
[58] Field of Search .................. 264/86, 87, 101, 102, 264/136, 137, 257, 258, 331.12, 331.19, 510, 546, 552, 553, DIG. 61, DIG. 56, 313, 511; 156/285, 286, 307.5, 309.3, 309.6, 311, 309.9

[56] References Cited

U.S. PATENT DOCUMENTS

| | | |
|---|---|---|
| 3,553,054 | 1/1971 | Maus . |
| 3,575,756 | 4/1971 | Maus . |
| 3,666,600 | 5/1972 | Yoshino . |
| 3,769,133 | 10/1973 | Halberschmidt et al. . |
| 3,862,897 | 1/1975 | Gattus ............................... 264/290.2 |
| 4,016,140 | 4/1977 | Morello .................................. 264/83 |
| 4,217,157 | 8/1980 | Stoltze et al. ........................ 156/286 |
| 4,231,827 | 11/1980 | Wilson et al. . |
| 4,451,321 | 5/1984 | McKelvey . |
| 4,600,617 | 7/1986 | Cole ............................... 264/331.12 |

Primary Examiner—James Lowe
Assistant Examiner—J. F. Durkin
Attorney, Agent, or Firm—Seed and Berry

[57] ABSTRACT

A method of consolidating fiber reinforced thermoplastic poly(amide-imide) components is disclosed that is suitable for use in fabricating large parts such as aircraft wing skins and the like. The method includes enclosing the part in a vacuum bag and placing the part in the bag in an autoclave. The method includes elevating the temperatures of the part to that where volatile solvent is substantially evaporated. Temperature of the part is then further increased until resin viscosity is reduced to a minimum. A pressure differential on the order of at least 150 psig is then applied at a high rate acting upon the article, causing the resin to flow to consolidate the part, resulting in a void-free composite.

13 Claims, 2 Drawing Sheets

METHOD OF CONSOLIDATING THERMOPLASTIC POLY(AMIDE-IMIDE) COMPONENTS

DESCRIPTION

1. Technical Field

This invention relates to methods for making fiber reinforced thermoplastic composite parts. More particularly, the invention involves methods of consolidating large thermoplastic poly(amide-imide) fiber reinforced composite components by increasing the temperature of the component selectively and applying consolidating pressures.

2. Background of the Invention

Heretofore, composite consolidation methods for a poly(amide-imide) composite included removing volatiles, such as organic solvents, from a prepreg by elevating the temperature of the part placed in an autoclave to boil off all or nearly all volatile material before applying autoclave pressure for resin flow and consolidation. The process cycles known and employed were somewhat successful for small components with large surface to volume ratios and short mass transfer distance. These systems generally were not suited for large components.

Larger parts require more time to completely boil off volatile material, having increased mass transfer distances over which solvent must be transported. Prior art processes increased the temperature driving force to overcome the increased time requirement to evolve solvents. As a consequence of the increased temperature, resin viscosity increased enough, as polymerization was initiated by high temperature, to preclude flow such that no consolidation was possible. Alternatively, applying consolidating pressure before complete removal of the volatile material resulted in void formation and resin cracking due to the hydrostatic pressure created by the volatile material.

Maus, in U.S. Pat. No. 3,553,054 and U.S. Pat. No. 3,575,756; Yoshino, in U.S. Pat. No. 3,666,600; Halberschmidt et al, in U.S. Pat. No. 3,769,133; Wilson et al, in U.S. Pat No. 4,231,827 and McKelvey, in U.S. Pat No. 4,451,321 describe various methods and apparatus for laying up polyimide laminates and methods of manufacturing laminated sheet material. The prior art addresses processing of epoxy resin based composites, for example, at 350° F. and at 85 psig. The resulting composite components are not suitable for high operating temperature applications. None of the prior art patents describe a method of processing thermoplastic poly(amide-imide) components that is suitable for consolidating large parts as described herein.

DISCLOSURE OF THE INVENTION

The invention includes a method of consolidating a composite article formed of a fibrous reinforcing material and a thermoplastic poly(amide-imide) resin that includes a solvent. The method of the invention boils off residual impregnated solvent by heating the article to a temperature above the boiling point of the solvent but below that temperature at which the resin begins to advance in molecular weight and, thus increases in resin viscosity. Once solvent has been removed, the article is increased in temperature to that where the resin is at minimum viscosity. A pressure differential is applied to the article while the resin is at minimum viscosity at such a rapid rate that the article is compressed and the resin flows, fully impregnating the reinforcing material. Preferably, the pressure is increased at a rate of at least 40 psi/min. to about 150-185 psig. The pressure is preferably maintained while the article is cooled and the composite hardens. The method of the invention produces void-free parts and is particularly useful for producing large composite parts.

The temperature increase to obtain minimum resin viscosity with applied pressure allows for consolidation or reconsolidation of laid up components of various sizes and including large aircraft wing skins and similar parts. The method requires that consolidating pressure be applied at the proper time, when the resin viscosity is at about its minimum, and at a sufficiently high rate of application that the resin flows in response thereto.

The method steps include heating the layed-up thermoplastic poly(amide-imide) part in an autoclave above a temperature of 400° F. At this temperature, sufficient dwell time is allowed for solvent removal. The part is then heated above 500° F. at which minimum resin viscosity is achieved and at a pressure of greater than 150 psig at a rate of about 40 psi per minute applied. The part is then consolidated and is cooled to room temperature, preferably under pressure such that any residual solvent does not volatilize.

The advantages and objects of the invention will become evident from the following detailed description when read in conjunction with the accompanying drawings which illustrate preferred embodiments of the invention.

BEST MODE FOR CARRYING OUT THE INVENTION

Figure 1:
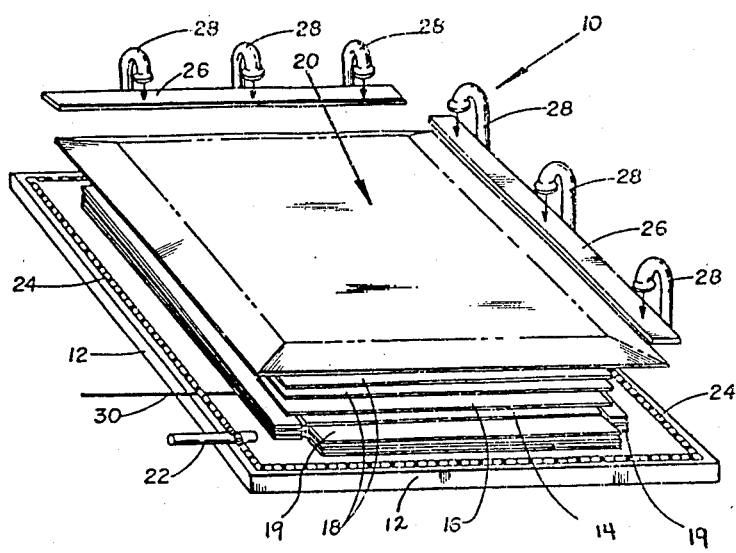
FIG. 1 illustrates an autoclave assembly for applying high pressure and high temperature to form a poly(amide-imide) composite.

In FIG. 1 a preferred autoclave assembly 10 for performing the poly(amide-imide) consolidation method of the invention is shown. The assembly 10 includes a tool base 12 capable of withstanding temperature exposures up to 700° F. without significant loss in stiffness. Steel and titanium have proven to be suitable for this temperature range. The tool base may be shaped or contoured as desired to, for example, mold a finished composite part during consolidation. A part 14 to be consolidated or reconsolidated is placed on top of the tool base 12 which has been coated with a release film to prevent adhesion during the consolidation cycle. The part 14 generally includes a plurality of plies of reinforcing fibers, woven or nonwoven, impregnated with a poly(amide-imide) thermoplastic dissolved in volatile solvent. A porous Teflon ®-coated fiberglass fabric release and breather ply 16 and layers of dry fiberglass fabric 18 are placed on top of the breather ply. The edges of the part 14 are trimmed in order to maintain a path for the volatile solvents to escape. Edge pieces 19 of dry fiberglass fabric are placed around the periphery of the part 14.

A thin film bag 20 of Kapton ® or other suitable high temperature material is placed over the part 14, contacting the base plate 12 to provide a vacuum seal for applying a vacuum to the part 14. A vacuum tube 22 may be installed through the bag 20 or under a high temperature seal 24 about the periphery of the base plate 12. The tube 22 could also be an integral part of the tool base 12. The bag 20 is secured to the tool base 12 using sealer bars 26 and clamps 28. For clarity, the bars and clamps are shown only on two of the four sides of the assembly 10. One or more thermocouples 30 are installed in the assembly 10 and a vacuum line is connected to the tube 22. The assembly 10 is now ready for placement into a high temperature and high pressure autoclave which is not shown in the drawings.

Figure 2:
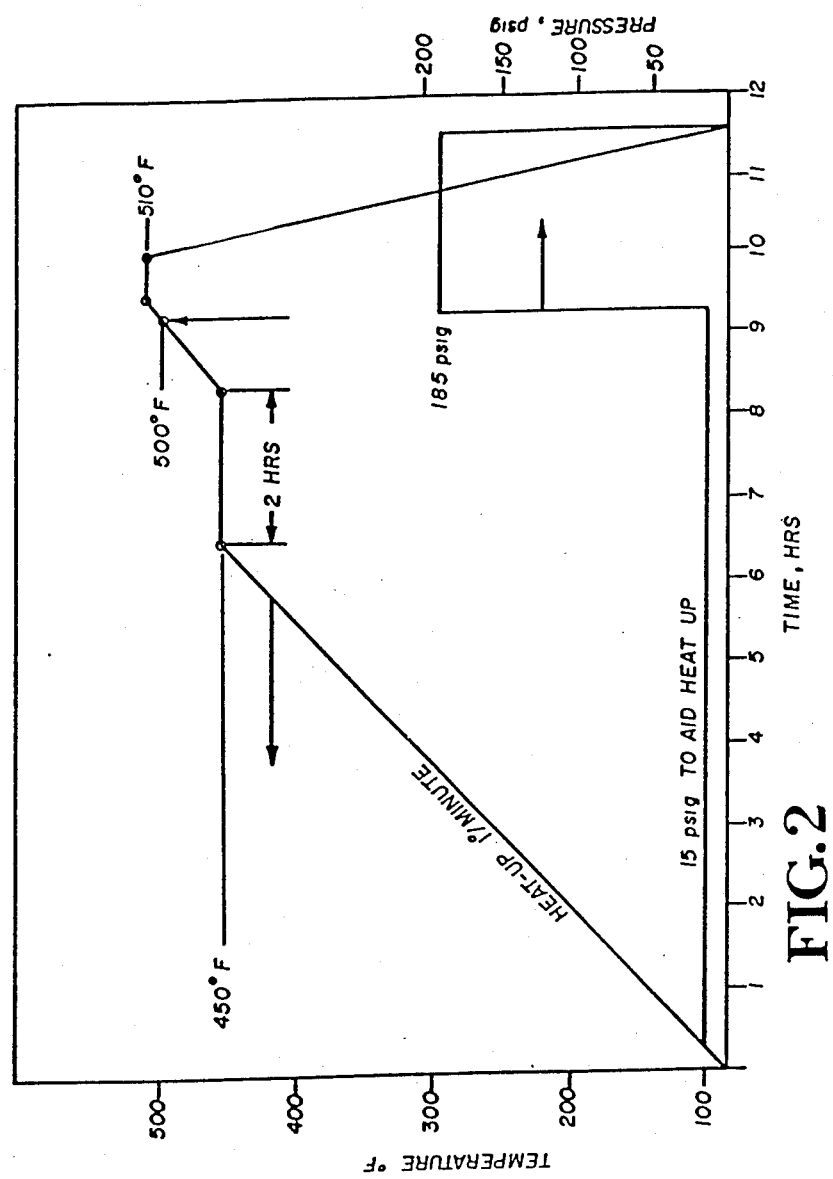
FIG. 2 illustrates an embodiment of the invention showing a pressure-temperature cycle for producing a large thermoplastic poly(amide-imide) composite.

In FIG. 2, a processing cycle of the method of the invention suitable for large parts is shown with temperature in degrees Fahrenheit represented by a vertical line and time in hours represented by a horizontal line. Also on the right hand side of the cycle diagram is a vertical line representing pressure in psig. In operation, the assembly 10 is sealed in the autoclave and a minimum vacuum of 22 inches of mercury is drawn through the vacuum tube 22. Simultaneously, the temperature of the autoclave is raised. Preferably, a minimum heat-up rate of one degree per minute is employed but there is no critical maximum time for heat-up. Also, fifteen psig steam pressure on the autoclave may be applied to aid in heat-up. The layed-up part 14 is taken from room temperature to above 400°, preferably to about 450 degrees, over a 6½ hour period. When the thermocouple 30, as shown in FIG. 1, reads 450° F.±10° F., the temperature increase is halted and a two hour dwell time at about 450° F. is started. Vapor pressure of the impregnation solvent will be elevated at this point and the breather system fabrics 18, 19 described previously will aid in the collection of vapors for a removal through the vacuum line 22.

After most of the solvent has evaporated, at about 8½ hours after the heat-up cycle started, the temperature is raised to a level where the viscosity of the polymer is at a minimum at about 500° F. At the same time, autoclave pressure is rapidly increased to 185 psi. The pressure differential rapidly consolidates the part while the resin viscosity is at its minimum. The pressure differential exerted upon the part 14 is maintained for a time sufficient to ensure complete penetration of reinforcing material with the resin. Additionally, the pressure will prevent the boiling of any remaining solvent. While the part temperature remains elevated, some resin curing, through polymer branching, chain extension and cross-linking may proceed. The temperature of the system remains below that at which polymer degradation occurs, for example, 680° F. for the poly(amide-imide) resins of interest.

With the pressure maintained to suppress volatilization of any remaining solvent, the part is allowed to cool to room temperature. Cooling rate depends only upon the maximum capacity of the autoclave and the assembly 10.

It is important that the consolidating pressure differential be applied at a rapid rate in order to squeeze the reinforcing plies together and force the resin to flow to completely infiltrate the assembled reinforcing material plies and form void-free composites. If the rate of pressure application is too low, the composite as a whole will simply deform as a viscous solid and resin will not flow to fully penetrate the reinforcing material. For relatively tightly woven graphite reinforcing cloth plies and poly(amide-imide) resins, a rate of pressure increase of about 40 psi/min. has been found to produce fully consolidate composite panels.

The initial heating cycle, shown in FIG. 2, is not heat-up rate dependent and the initial dwell time can be adjusted based on the size of the component. In addition, the processing methods of the invention are also suitable for reconsolidation of previously consolidated components. That is, a previously consolidated part could be cycled by a method of the invention, for example as shown in FIG. 2, to produce void-free consolidated parts.

Figure 3:
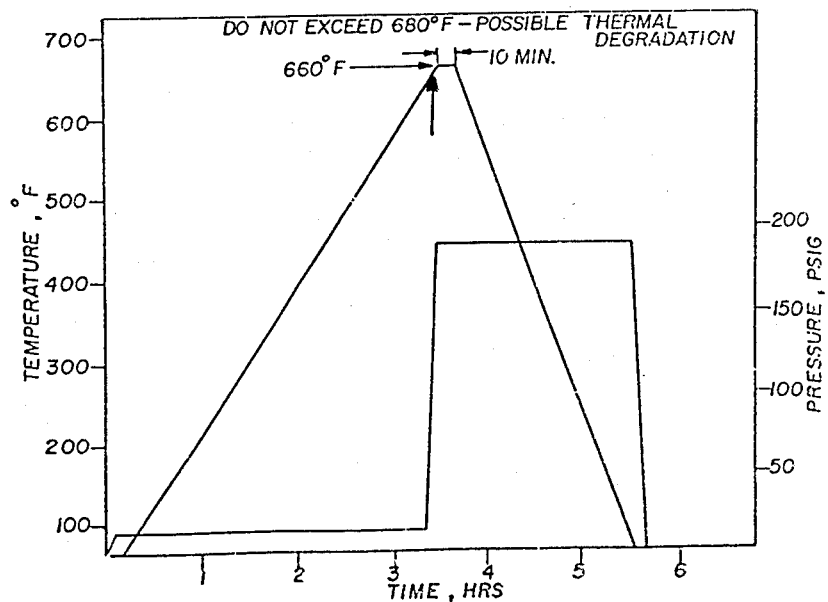
FIG. 3 illustrates an alternate method cycle for producing composites with smaller surface to volume ratios.

In FIG. 3, a method cycle of the invention is shown for consolidating a part 14 which has a relatively smaller surface to volume ratio. The layed-up part is placed in the autoclave assembly 10 and sealed in the autoclave, as described for large parts. The part is elevated in temperature at a selected heat-up rate. A 15 psig autoclave pressure is applied with a minimum vacuum of 22 in of mercury during heat-up. The heat and mass transfer conditions of the relatively small parts allow a relatively higher heat-up rate. A preferred minimum heat-up rate is about 3° F./min. For these parts, the temperature may be elevated to the minimum viscosity temperature for the resin without the necessity of holding below 500° F. until the solvent has evaporated. The heat-up rate is balanced with solvent removal, the temperature at which minimum viscosity occurs and the rate at which advancement of the resin occurs such that application of pressure fully consolidated the part.

When the part temperature as indicated by the thermocouple 30 reaches 650° F., the autoclave pressure is raised to 185 psig at a minimum rate of about 40 psi per minute. As discussed above, the selected rate of high pressure application must be sufficient to cause the resin to flow to achieve a void-free part. The temperature is held at 660° F. to allow the part to consolidate for on the order of about 10 minutes. Holding time is not critical. The part 14 is then cooled to room temperature. The autoclave pressure is released when the temperature falls below 200° F. The part is then removed as a fully consolidated component and ready for any further manufacturing operation.

Changes may be made in the construction and arrangement of the parts or elements of the embodiments as described herein without departing from the spirit or scope of the invention defined in the following claims.

We claim:

1. A method of consolidating a composite article formed of a fibrous reinforcing material and a thermoplastic poly(amide-imide) resin that includes a solvent, comprising the steps of:

heating the article to a first temperature, wherein said first temperature is greater than the boiling point of the solvent but less than the temperature at which said resin begins to advance in molecular weight and increase in viscosity;

maintaining the article at said first temperature while removing substantially all of the solvent from the article;

heating the article to a second temperature wherein at said second temperature the viscosity of the resin and remaining solvent is minimized;

applying a pressure differential that acts upon said article at a sufficiently rapid rate of increase such that said article is compressed and said resin flows and fully impregnates said reinforcing material to form a substantially void-free composite; and cooling said article while maintaining said pressure differential such that residual solvent remaining in the article does not volatilize.

2. The method of claim 1 wherein said article is enclosed in a bag subjected to a continuous vacuum during heating to remove solvent form said article.

3. The method of claim 2 wherein said article is supported on a rigid base and said bag is a film enclosing said article and sealed to said base.

4. The method of claim 2 wherein the steps of heating and applying a pressure differential to said article are conducted by means of enclosing said article in an autoclave including means for adjusting heat and pressure.

5. The method of claim 1 wherein the step of applying a pressure differential to said article includes enclosing said article in a press and applying pressure thereto to squeeze and cause said resin to flow and fully impregnate the reinforcing material.

6. The method of claim 1 wherein the step of applying a pressure differential to said article includes applying pressure at a rate of at least about 40 psi/minute.

7. A method of consolidating a large composite article, formed of a fibrous reinforcing material and a thermoplastic poly(amide-imide) resin that includes a solvent, comprising the steps of:
enclosing and sealing said article in a bag subjected to a vacuum;
placing said article in an autoclave;
heating the autoclave to a temperature of about 450 degrees F.;
maintaining said autoclave temperature at about 450 degrees F. and evacuating said bag such that said resin solvent is evaporated from said article and removed from said article and said autoclave;
heating the autoclave to a temperature of about 500 degrees F., wherein the viscosity of said resin is minimized;
increasing the pressure in the autoclave to a pressure above 150 psig, said pressure increase being applied substantially simultaneously with said step of heating to about 500 degrees F. and at a sufficiently rapid rate that said article is compressed and said resin is caused to flow, fully impregnating said reinforcing material to form a substantially void-free composite; and
cooling the autoclave whereby said article is completely consolidated.

8. The method of claim 7 further comprising the step of applying about 15 psig pressure in the autoclave during the step of heating of said article to about 450 degrees F.

9. The method of claim 7 wherein during the step of cooling the autoclave, a pressure of about 150 psig is maintained such that any solvent remaining in said resin does not volatilize.

10. A method of consolidating a composite article formed of a fibrous reinforcing material and a thermoplastic poly(amide-imide) resin that includes a solvent to produce a substantially void-free composite, comprising the steps of:
enclosing the article in a bag subjected to a vacuum;
placing the article in an autoclave;
heating the autoclave at a rate of at least 3 degrees F. per minute to a temperature above 660 degrees F.;
maintaining the temperature of the autoclave at about 660 degrees F., such that said solvent is substantially completely evaporated from said article and removed from the article and the autoclave by means of said vacuum;
increasing the pressure in said autoclave to a pressure above 150 psig when said resin reaches a minimum viscosity, wherein said pressure is applied at a sufficiently rapid rate such that said resin is caused to flow, fully impregnating said reinforcing material and forming a substantially void-free composite; and
cooling said article while maintaining said pressure above 150 psig such that any solvent remaining in the article does not volatilize.

11. The method of claim 10 further comprising the step of applying pressure of about 15 psig in the autoclave during the step of heating to a temperature above 660 degrees F.

12. The method of claim 10 wherein the step of increasing the pressure in the autoclave includes increasing the pressure at a rate of at least about 40 psi/minute.

13. The method of claim 7 wherein the step of increasing the pressure in the autoclave above 150 psig includes increasing the pressure at a rate of at least 40 psi/minute.

* * * * *